United States Patent [19]

Clouet

[11] Patent Number: 5,658,986
[45] Date of Patent: Aug. 19, 1997

[54] POLYMERS CONTAINING THIURAM DISULFIDE GROUPS AND THEIR PREPARATION

[75] Inventor: Gilbert Clouet, La Wantzenau, France

[73] Assignee: Atochem, Paris la Defense, France

[21] Appl. No.: 574,143

[22] Filed: Dec. 18, 1995

Related U.S. Application Data

[62] Division of Ser. No. 582,638, Sep. 14, 1990, Pat. No. 5,489,654.

[30] Foreign Application Priority Data

Sep. 14, 1989 [FR] France .................... 89 12061

[51] Int. Cl.$^6$ .................................. C08L 59/04
[52] U.S. Cl. ..................... 525/88; 525/90; 525/92; 525/95; 525/98; 525/343; 525/535
[58] Field of Search .................. 525/88, 90, 92, 525/95, 98, 343, 535

[56] References Cited

U.S. PATENT DOCUMENTS

| | | | |
|---|---|---|---|
| 3,951,790 | 4/1976 | Fujisawa et al. | 210/38 B |
| 4,758,608 | 7/1988 | Collins et al. | 522/43 |
| 5,089,581 | 2/1992 | Clouet | 528/12 |
| 5,175,226 | 12/1992 | Clouet | 528/12 |
| 5,189,112 | 2/1993 | Clouet | 525/328.2 |
| 5,200,545 | 4/1993 | Clouet et al. | 558/159 |
| 5,237,020 | 8/1993 | Clouet | 525/479 |
| 5,288,808 | 2/1994 | Clouet | 525/303 |
| 5,489,654 | 2/1996 | Clouet | 525/398 |

FOREIGN PATENT DOCUMENTS

| | | |
|---|---|---|
| 3420731 | 4/1989 | European Pat. Off. . |
| 1091317 | 1/1954 | France . |

OTHER PUBLICATIONS

Nair et al., "Functionalization of PMA . . . ", J. of Polymer Sci., vol. 27, pp. 1795–1809 (1989).

*Primary Examiner*—W. Robinson H. Clark
*Attorney, Agent, or Firm*—Millen, White, Zelano, & Branigan, P.C.

[57] ABSTRACT

These copolymers are denoted by the formulae:

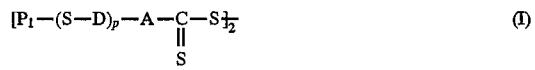

(I)

or

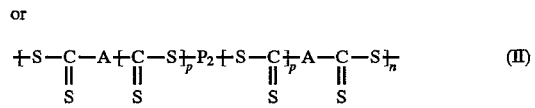 (II)

$P_1$, $P_2$=vinyl or dienic (p with a value of 1), or polyoxyalkylene, polyester or polyamide (p with a value of 0) polymer block;

A=(1)

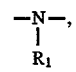

with $R_1$ denoting, among others, alkyl;

(2)

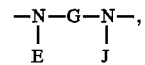

where E, G, J have various meanings;

(3)

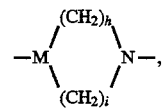

M, joined to D, having the value

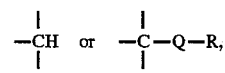

h, i, Q and R having various meanings;

D=a single bond or (cyclo)alkylene or arylene group;
n=1 to 20.

These polymers are iniferters in radical polymerization of vinyl monomers. The macroiniferters (I) and the polyiniferters (II) result, respectively, in triblock copolymers PA—PB—PA and diblock copolymers —(PA—PB—)$_z$a, z having a value from 2 to 25.

21 Claims, No Drawings

POLYMERS CONTAINING THIURAM DISULFIDE GROUPS AND THEIR PREPARATION

This is a division, of the application Ser. No. 07/582,638 filed Sep. 14, 1990, now U.S. Pat. No. 5,489,654.

The present invention relates to polymers containing at least one thiuram disulfide group in their main chain. These pollers constitute agents which have the triple function of initiator, chain transfer agent and terminating agent in the radical polymerization of vinyl monomers. Such agents are commonly referred to by the abbreviation "iniferter". In the present invention the term "macroiniferter" will be employed to denote those iniferter polymers comprising a single thiuram disulfide group in their main chain, and the term "poly-iniferter" to denote those iniferter polymers comprising more than one thiuram disulfide group in their main chain.

The invention also relates to the preparation of these macro- and polyiniferters from acrylic, dienic or polyoxyalkylene type polymers terminated by an amine group at one end or at both ends of their chain respectively.

The invention also relates to block copolymers which can be obtained by starting with,these macro- and polyiniferters and which comprise vinyl or dienic blocks.

In the case where the macro- or polyiniferters of the invention bear phosphorus-containing groups, the corresponding block polymers can be used to constitute or to form part of the constitution of flame-retardant materials.

The present invention results from new developments in research in the field of radical polymerization with the aid, as iniferters, of compounds containing one or more thiuram disulfide groups, the vinyl or dienic polymeric blocks being inserted between the two sulfurs of a thiuram group. The invention makes it possible to obtain vinyl block polymers consisting of hard blocks alternating with soft blocks, or else hydrophilic blocks alternating with hydrophobic blocks (amphiphilic copolymers).

First of all, therefore, the subject of the present invention is a polymer containing at least one thiuram disulfide group in its main chain and denoted by the formula:

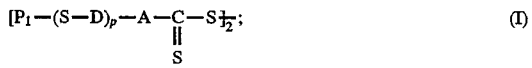
(I)

or

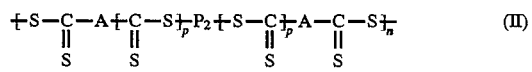
(II)

where:

each of $P_1$ and $P_2$ denotes a polymer block originating from at least one monomer chosen from vinyl and dienic monomers, in which case p has the value of 1, or else a polymer block chosen from polyoxyalkylene, polyester or polyamide blocks, in which case p has the value of 0;

A denotes:

(1) an

residue, $R_1$ denoting a linear or branched alkyl group optionally comprising at least one hetero atom and/or at least one

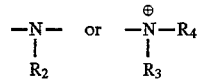

residue, (each of $R_2$, $R_3$ and $R_4$ denoting an alkyl, cycloalkyl or aryl group) and optionally bearing at least one functional group;

this meaning (1) of A being valid for the formula (I) except if $P_1$ is a polyamide block or a polyester block originating from a polyester terminated by an acidic or ester functional group, and for formula (II), but only if $P_2$ is a polyoxyalkylene block or a polyester block originating from a polyester terminated by OH functional groups;

(2) an

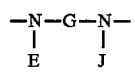

residue, where:

G denotes:

a $—(CR_5R_6)_a—$ residue, with each of $R_5$ and $R_6$ denoting, independently of each other, hydrogen or an alkyl residue, which optionally comprises at least one hetero atom and/or at least one

residue, $R_7$ being chosen from alkyl, cycloalkyl and aryl groups, and a denoting an integer from 1 to 6; or the residue of an aliphatic ring which may contain at least one hetero atom;

E and J denote, independently of each other, an alkyl group optionally comprising at least one hetero atom and/or at
least one

residue, $R_8$ being chosen from alkyl, cycloalkyl and aryl groups; a cycloalkyl group; an aryl group; —K—L, K denoting a single bond; an alkylene group optionally comprising a hetero atom and/or at least one

residue, $R_9$ being chosen from alkyl, cycloalkyl or aryl residues; a cycloalkylene group; or an arylene group; and L denotes a functional group, it being possible for each of the groups E, J, $R_8$ and $R_9$ to bear at least one functional group, it being possible for E and J of the

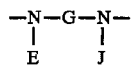

group to be joined to form a nitrogenous heterocyclic ring; it being also possible for the

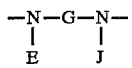

group to denote:

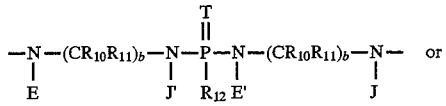

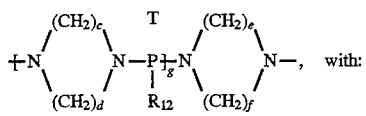

b denoting an integer from 1 to 12;

each of $R_0$ and $R_{11}$ denoting, independently of each other, hydrogen or a $C_1$-$C_{12}$ alkyl residue, said alkyl residue optionally comprising at least one hetero atom and/or at least one

residue, $R_{13}$ being chosen from alkyl, cycloalkyl and aryl groups;

E' and J' having the same meanings as E and J respectively;

T denoting an oxygen or sulfur atom, and it being possible for =T to be absent;

$R_{12}$ denoting a $C_1$-$C_{12}$ alkyl or alkoxy, $C_3$-$C_{12}$ cycloalkyl or cycloalkoxy, aryl or aryloxy group, it being possible for these groups to bear substituents;

each of c, d, e and f independently denoting an integer from 1 to 3;

g denoting an integer from 10 to 40;

(3) it being also possible, when $P_1$ denotes a vinyl or dienic block, for A to denote a

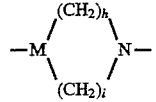

residue in formula (I)

where:

M, joined to D, denotes

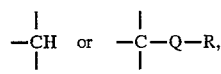

Q denoting a single bond or an alkylene, cycloalkylene or arylene group and R denoting COOH, COOR$_{14}$ (R$_{14}$ denoting alkyl, cycloalkyl or aryl), OH, a phosphorus-containing group, —CN or an

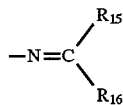

imine residue, with each of $R_{15}$ and $R_{16}$ independently denoting a $C_6$-$C_{10}$ aromatic group, a $C_5$-$C_{10}$ cycloaliphatic group or a $C_1$-$C_6$ aliphatic group; and each of h and i denoting an integer from 1 to 3;

D denotes a single bond or else an alkylene, cycloalkylene or arylene group, it being possible for D to denote only a single bond in the case where M denotes CH;

n has a value from 1 to 20, especially from 2 to 10.

The polymers of formula (II) are cyclized onto themselves, or not. In this latter case, the formula (II) is written:

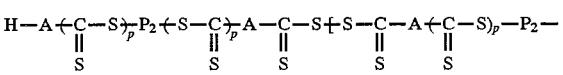
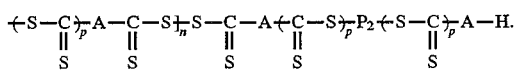

Vinyl monomers which may be mentioned are alkyl methacrylates and acrylates in which the alkyl group contains, for example, from 1 to 8 carbon atoms, vinylaromatic hydrocarbons, unsaturated nitriles, cyanoethyl acrylates, acrylamide, lower hydroxyalkyl acrylates and methacrylates, acrylic acid and methacrylic acid/maleic anhydride and maleimides substituted by alkyl or aryl groups. Particular mention may be made of methyl, ethyl, isopropyl, n-butyl and tert-butyl methacrylates, methyl, ethyl, n-propyl, n-butyl, n-hexyl, 2-ethylhexyl, isopropyl, isobutyl and tert-butyl acrylates, styrene, alphamethylstyrene, monochlorostyrene, tert-butylstyrene, vinyltoluene, 2-vinylpyridine and 4-vinylpyridine, and the like.

Dienic monomers which may be mentioned are, among others, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)-2-norbornene, 1,5-cyclooctadiene, bicyclo[2.2.2]-2,5-octadiene, cyclopentadiene, 4,7,8,9-tetrahydroindene and isopropylidenetetrahydroindene.

The polyoxyalkylene block $P_1$ may be chosen from the blocks of formulae:

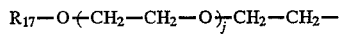
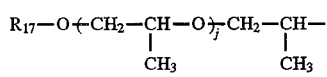
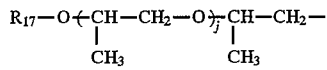
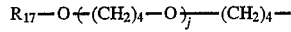

where:

$R_{17}$ denotes an alkyl, cycloalkyl or aryl residue; and j has a value from 1 to 1,000, preferably from 1 to 200.

The polyester block $P_1$ is especially a block chosen from:

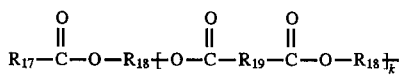
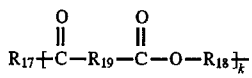
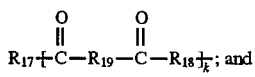
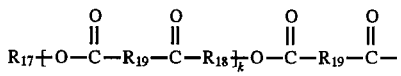

where:

$R_{17}$ is such as defined above;

each of $R_{18}$ and $R_{19}$ independently denotes an alkylene, cycloalkylene, arylene, alkenylene or alkenyl-substituted arylene residue, it being possible for these residues to comprise at least one hetero atom and/or at least one

residue, $R_{20}$ being chosen from alkyl, cycloalkyl and aryl groups and being capable of bearing substituents; and k has a value from 1 to 300, preferably from 1 to 50.

Examples of residues $R_{18}$ and $R_{19}$ which comprise at least one unsaturation, which may be mentioned are the residues:

$$-CH_2-CH=CH-CH_2-$$

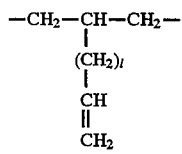

l having a value from 1 to 22

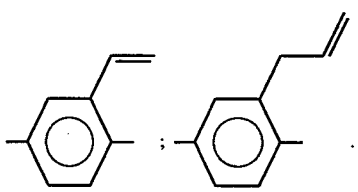

The polyamide block $P_1$ is especially a block:

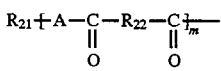

or a block:

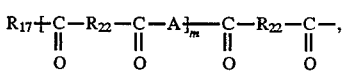

where:

$R_{21}$ denotes $R_{17}$ or

and $R_{22}$ has the same definition as $R_{18}$ or $R_{19}$, m has a value from 1 to 300, preferably from 1 to 50.

As for the polyoxyalkylene block $P_2$, this may be chosen from the blocks of formulae:

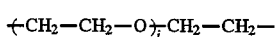

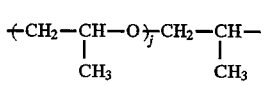

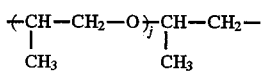

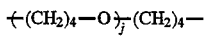

j having a value from 1 to 1,000, preferably from 1 to 200.

The polyester block $P_2$ is especially a block of formula:

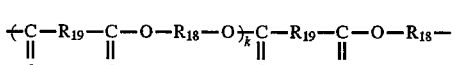

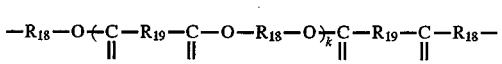

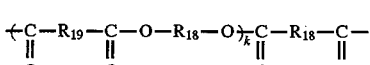

$R_{18}$, $R_{19}$ and k being such as defined above.

The polyamide block $P_2$ is especially a block of formula:

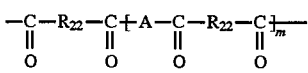

$R_{22}$ and m being such as defined above.

The alkyl groups forming part of the definition of formulae (I) and (II) above are especially $C_1-C_{12}$, in particular $C_1-C_6$, alkyl groups. The cycloalkyl groups are especially $C_3-C_{12}$, in particular $C_5-C_7$, cycloalkyl groups; and the aryl groups are, for example, phenyl or naphthyl groups. The hetero atoms are especially O or S. Furthermore, when it is indicated that a group may denote an alkyl, cycloalkyl or aryl residue or an alkylene, cycloalkylene or arylene residue, the combinations of at least two of these residues are also intended, for example an aralkyl, alkaryl residue and the like.

The functional groups carried by $R_1$, E, J, $R_8$ and $R_9$ or else the functional groups forming part of the definition of L are chosen from the groups:

OH;

$OR_{23}$, $R_{23}$ denoting an alkyl, cycloalkyl or aryl group;

COOH;

$COOR_{24}$, $R_{24}$ denoting an alkyl, cycloalkyl or aryl group;

$Si(R_{25})_2H$, $R_{25}$ denoting an alkyl, cycloalkyl, alkoxy, aryl or aryloxy group;

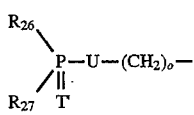

in which:
each of $R_{26}$ and $R_{27}$, which are identical or different, denotes an alkyl, alkoxy, cycloalkyl cycloalkoxy, aryl, aryloxy or

group (each of $R_{28}$ and $R_{29}$ independently denoting alkyl, cycloalkyl or aryl), it being possible for each of the groups $R_{26}$, $R_{27}$, $R_{28}$ and $R_{29}$ to be substituted by at least one halogen atom;

T' denotes an oxygen or sulfur atom;
U denotes a single bond or —O— or else

$R_{30}$ being chosen from alkyl, cycloalkyl or aryl groups;
o ranges from 0 to 12;
CN

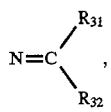

each of $R_{31}$ and $R_{32}$ denoting a $C_6$–$C_{10}$ aromatic group, a $C_5$–$C_{10}$ cycloaliphatic group or a $C_1$–$C_6$ aliphatic group.

G may denote, among others, a —$(CH_2)_q$— residue, q having a value from 1 to 6, or a residue

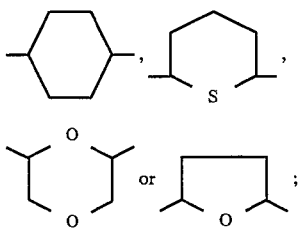

the group

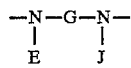

may denote, among others,

Another subject of the present invention is a process for the preparation of the polymer of formula (I), $P_1$ denoting a polymer block originating from at least one monomer $M_1$ chosen from vinyl and dienic monomers, in which:

in a first stage, the radical polymerization of the monomer $M_1$ is conducted in the presence of at least one free-radical initiator and of at least one transfer agent of formula:

$$HS—D—A—H \qquad (III)$$

or $$HS—D—\overset{\oplus}{A}H_2\overset{\ominus}{X} \qquad (III')$$

in which D and A are such as defined above and X denotes halogen, it being possible for the hydrogen of the terminal secondary amine group to be replaced by a protective group such as —$Si(R_{33})_3$, $R_{33}$ denoting alkyl, aryl or cycloalkyl, which results in the polymer terminated by an amine group of formula:

$$P_1—S—D—AH \qquad (IV)$$

or $$P_1—S—D—\overset{\oplus}{A}H_2\overset{\ominus}{X} \qquad (IV')$$

in a second stage, if need be after regeneration of the secondary amine, for example by hydrolysis, polymer (IV) or (IV') is reacted with carbon disulfide in the presence of at least one oxidizing agent or by adding this agent after the reactions.

In the first stage of this process the polymerization is conducted either in bulk or in a solvent medium, at a temperature of, for example, between approximately 30° and 160° C. The solvent is chosen especially from those capable of solubilizing the polymer chain, for example tetrahydrofuran, toluene, ethanol and mixtures thereof.

The oxidizing agent employed in the second stage is chosen, for example, from iodine, aqueous hydrogen peroxide, alkali metal hypochlorites and alkyl and aryl hydroperoxides.

In this second stage a substantially equimolar ratio of polymer (IV) or (IV') to $CS_2$ can be employed, it being possible for the reaction to be performed in the presence of a tertiary amine (for example pyridine or triethylamine), in a proportion of approximately 1 mole per mole of polymer (IV) or of approximately 2 moles per mole of polymer (IV'). The oxidizing agent is added, for example, in a proportion of approximately 1 mole per mole Of $CS_2$.

In this second stage the reaction is exothermic and its exothermicity is controlled by any known means. Furthermore, it is preferably carried out in a solvent medium, it being possible for $CS_2$ itself to perform the function of a solvent.

The invention also relates to polymers of formula:

$$P_1—S—D—AH \qquad (IV)$$

or $$P_1—S—D—\overset{\oplus}{A}H_2\overset{\ominus}{X} \qquad (IV')$$

in which:
$P_1$ is a vinyl or dienic polymer block; and
D, A and X are such as defined above;
it being possible for the hydrogen of the terminal secondary amine group to be replaced by a protective group as indicated above;

and to the process for their preparation, consisting in conducting the polymerization of the vinyl or dienic monomer $M_1$ in the presence of at least one free-radical initiator and of at least one transfer agent of formula:

$$HS-D-AH \qquad (III)$$

or $$HS-D-\overset{\oplus}{A}H_2\overset{\ominus}{X} \qquad (III')$$

in which D, A and X are such as defined above.

The invention also relates to a process for the preparation of the polymer of formula (II), $P_2$ denoting a polymer block originating from at least one monomer $M_2$ chosen from vinyl and dienic monomers, in which:

in a first stage, a compound of formula:

$$\begin{array}{c} WN-G-NH \\ | \quad\quad | \\ E \quad\quad J \end{array} \qquad (V)$$

or $$\begin{array}{c} WN-G-\overset{\oplus}{N}H_2X^{\ominus} \\ | \quad\quad | \\ E \quad\quad J \end{array} \qquad (V')$$

in which:

W is a protective group, such as $-Si(R_{34})_3$, $R_{34}$ denoting alkyl, aryl or cycloalkyl;

E, G and J or $$\begin{array}{c} -N-G-N- \\ | \quad\quad | \\ E \quad\quad J \end{array}$$

are such as defined above;
and

X denotes halogen, is reacted with carbon disulfide in the presence of at least one oxidizing agent or by adding this agent after the reaction, and the product obtained is then hydrolyzed, which results in the compound of formula:

$$[HN-G-N-C-S\tfrac{1}{2}]_2; \qquad (VI)$$
$$\begin{array}{cccc} | & | & \| & \\ E & J & S & \end{array}$$

in a second stage the polymerization of the monomer $M_2$ is conducted in the presence of the compound (VI) to obtain the polymer of formula:

$$\begin{array}{ccccccc} E & J & & & J & E & \\ | & | & & & | & | & (VII) \\ HN-G-N-C-S-P_2-S-C-N-G-NH; & \text{and} \\ & & \| & & \| & & \\ & & S & & S & & \end{array}$$

in a third stage polymer (VII) is reacted with carbon disulfide in the presence of at least one oxidizing agent or by adding this agent after the reaction.

In the first stage a substantially equimolar ratio of compound (V) or (V') to $CS_2$ can be employed, it being possible for the reaction to be carried out in the presence of a tertiary amine in a proportion of approximately 1 mole per mole of compound (V) or of approximately 2 moles per mole of compound (V'). The oxidizing agent is added, for example, in a proportion of approximately 1 mole of $CS_2$.

In the second stage the polymerization is conducted either in bulk or in a solvent medium, the latter being chosen especially from those capable of solubilizing the compound (VI), for example toluene, tetrahydrofuran, ethanol and mixtures thereof, at a temperature of between approximately 30° and 160° C.

In the third stage a molar ratio of compound (VII) to $CS_2$ which is substantially from 1 to 2 is preferably employed, it being possible for the reaction to be carried out in the presence of a tertiary amine in a proportion of approximately 1 mole per mole of $CS_2$. The oxidizing agent is added, for example, in a proportion of approximately 1 mole per mole of $CS_2$.

The present invention also relates to a process for the manufacture of the polymer of formula (I), $P_1$ denoting a polyoxyalkylene block or a polyester block originating from a polyester terminated by an alcohol functional group, in which:

in a first stage a polymer of formula:

$$P_1-OH \qquad (VIII)$$

is reacted with a halogenating agent, for example a chlorinating agent, such as bromine, iodine, chlorine or their organic compounds, such as $SOCl_2$, to obtain a polymer of formula:

$$P_1-Hal \qquad (IX)$$

where Hal denotes halogen;

in a second stage, polymer (IX) is reacted with an excess of the compound of formula:

$$H-A-H \qquad (X);$$

or $$\overset{\oplus}{H}AH_2X^{\ominus} \qquad (X')$$

if A has the meaning (1) or (3); or $$X_2^{\ominus}\overset{\oplus}{H}A_{\oplus}H_2X^{\ominus} \qquad (X'')$$

if A has the meaning (2),
where A and X are such as defined above; or with a compound of formula:

$$\begin{array}{c} W-N-G-NH \\ | \quad\quad | \\ E \quad\quad J \end{array} \qquad (V)$$

or $$\begin{array}{c} W-N-G-\overset{\oplus}{N}H_2X^{\ominus} \\ | \quad\quad | \\ E \quad\quad J \end{array} \qquad (V')$$

in which case the resulting product is hydrolyzed after its formation,
which results in the polymer of formula:

$$P_1-AH \qquad (XI)$$

in a third stage, polymer (XI) is reacted with carbon disulfide in the presence of at least one oxidizing agent or by adding this agent after the reaction.

In the first stage of this process the reaction is preferably conducted at a temperature of approximately 5° to approximately 30° C., in a solvent medium, the solvent being chosen especially from aromatic solvents such as toluene.

In the second stage the reaction is preferably conducted at a temperature of approximately 20° to 90° C., in the presence of an unreactive solvent such as anhydrous acetonitrile. In this stage at least 2 moles of compound (X), preferably at least 4–5 moles of compound (X) are especially employed per 1 mole of polymer (IX).

In the third stage a substantially equimolar ratio of polymer (XI) to $CS_2$ is preferably employed, it being possible for the reaction to be carried out in the presence of a tertiary amine in a proportion of approximately 1 mole per mole of polymer (IX). The oxidizing agent is added, for example, in a proportion of approximately 1 mole per mole of $CS_2$.

The present invention also relates to a process for the manufacture of the polymer of formula (II), $P_2$ denoting a polyoxyalkylene block or a polyester block originating from a polyester terminated by alcohol functional groups, in which:

in a first stage a polymer of formula:

$$HO—P_2—OH \qquad (XII)$$

is reacted with a halogenating agent, to obtain a polymer of formula:

$$Hal—P_2—Hal \qquad (XIII)$$

where Hal denotes halogen;

in a second stage, polymer (XIII) is reacted with an excess of compound (X) or (X') or (X") or with compound (V) or (V'), which results, after hydrolysis if need be, in the polymer of formula:

$$HA—P_2—AH \qquad (XIV);$$

and in a third stage, polymer (XIV) is reacted with carbon disulfide in the presence of at least one oxidizing agent or by adding this agent after its formation.

In the first stage the reaction is preferably conducted at a temperature of between approximately 5° and 30° C., in a solvent medium, the latter being chosen especially from aromatic solvents such as toluene.

In the second stage the reaction is preferably conducted at a temperature from approximately 20° to approximately 90° C. in the presence of an unreactive solvent such as anhydrous acetonitrile.

In the third stage a molar ratio of polymer (XIV) to $CS_2$ close to 1:2 is preferably employed, it being possible for the reaction to be carried out in the presence of a tertiary amine in a proportion of approximately 1 mole per mole of $CS_2$. The oxidizing agent is added, for example, in a proportion of approximately 1 mole per mole of CS2.

The present invention also relates to a process for the manufacture of a polymer of formula (I) where $P_1$ is a polyamide block or a polyester block originating from a polyester terminated by an acidic or ester functional group, in which the starting polymer employed is a polyamide terminated by a secondary amine functional group or else a polyamide or a polyester terminated by an acidic or ester functional group, which is reacted with an excess of compound (X) or (X") or with a compound (V) or (V'), to obtain, after hydrolysis if need be, a polymer $P_1$—AH, which is reacted with carbon disulfide in the presence of at least one oxidizing agent or by adding this agent after the reaction.

The present invention also relates to a process for the manufacture of a polymer of formula (II) where $P_2$ is a polyamide block or a polyester block originating from a polyester terminated by acidic or ester functional groups, in which the acidic or ester ends of the starting polyester and, if appropriate, the acidic or ester ends of the starting polyamide, are converted by reaction with an excess of compound (X) or (X") or with a compound (V) or (V'), A denoting

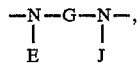

to obtain, after hydrolysis if need be, a polymer HA—$P_2$—AH, which is reacted with carbon disulfide in the presence of at least one oxidizing agent or by adding this agent after the reaction.

In the first stage of these last two processes the reaction is conducted, preferably at a temperature of between approximately 5° C. and 30° C., in a solvent medium, the solvent being chosen especially from those known to the specialist which make it possible to solubilize the polyester or polyamide blocks.

In the second stage of these last two processes, in the first case, a substantially equimolar ratio of the polymer $P_1$—AH to $CS_2$ is preferably employed, it being possible for the reaction to be carried out in the presence of a tertiary amine in a proportion of 1 mole per mole of polymer $P_1$—AH, and the oxidizing agent being added, for example, in a proportion of approximately 1 mole per mole of $CS_2$; and, in the second case, a ratio of polymer HA—$P_2$—AH to $CS_2$ of approximately 1:2 is preferably employed, it being possible for the reaction to be carried out in the presence of a tertiary amine in a proportion of 1 mole per mole of polymer HA—$P_2$—AH and the oxidizing agent being added, for example, in a proportion of approximately 1 mole per mole of $CS_2$.

The present invention also relates to triblock copolymers of formula:

$$PA—PB—PA$$

in which PA is a vinyl, dienic, polyoxyalkylene, polyester or polyamide polymer block and PB is a vinyl or dienic polymer block other than PA when PA is also a vinyl or dienic block, PA originating from the macroiniferter of formula (I).

The invention also relates to a process for the manufacture of these triblock copolymers, in which the polymerization of a monomer B is conducted in the presence of a compound of formula (I) at a temperature approximately from 50° to 160° C., to obtain the polymer of formula:

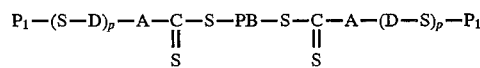

where

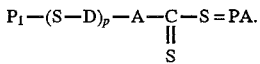

The present invention also relates to diblock copolymers of formula:

$$—(PA—PB)_{\overline{z}}$$

in which PA and PB are different vinyl or dienic blocks or else PA is a polyoxyalkylene, polyester or polyamide block and PB a vinyl or dienic block, PA originating from the polymer of formula (II) such as defined above, with z having a value from 2 to 25, especially from 2 to 10.

The invention also relates to a process for the manufacture of these diblock copolymers, in which the polymerization of a monomer B is conducted in the presence of a compound of formula (II), at a temperature approximately from 50° to 160° C. to obtain the polymer of formula:

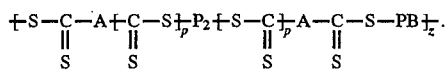

In other words, the PB block is inserted between the thiuram disulfide functional groups in formula (II) as evolved above.

The following examples illustrate the present invention without, however, limiting its scope. The following abbreviations have been employed in these examples:

St: styrene
MMA: methyl methacrylate
EA: ethyl acrylate
THF: tetrahydrofuran
AIBN: azobisisobutyronitrile
AET: 2-aminoethanethiol
BAET: 2-butylaminoethanethiol
DAET: 2-diethylaminoethanethiol
MEP: N-(2-mercaptoethyl)piperazine
BSAET: (N-1-butyl-N-trimethylsilyl)-2-aminoethanethiol
PSt: polystyrene
PMMA: poly(methyl methacrylate)
PEA: poly(ethyl acrylate).
POE: polyoxyethylene In all cases a quantitative analysis of the polymers obtained was conducted and the molecular masses were obtained from the GPC results and from intrinsic viscosity measurements. The polymers comprising NH amine functional groups were subjected to a specific determination of the functional group. The $^1$H NMR and IR spectra confirmed the expected structures.

EXAMPLE 1

Preparation of the macroiniferter of formula:

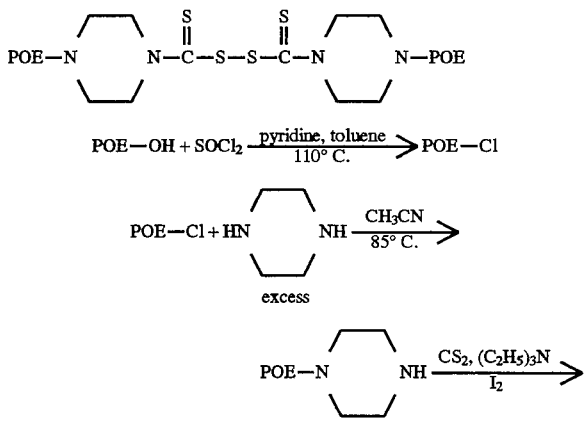

expected product 0.005 moles of POE-OH ($\overline{Mn}$: 5,000; 0.005 moles) are dissolved in 180 ml of toluene and dried by azeotropic distillation. Approximately 30 ml of toluene are recovered. 0.01 mole of pyridine is added to the remaining solution, followed by 0.01 mole of thionyl chloride, portionwise, while bringing up to reflux under argon. The system is kept under reflux for 4 hours and is then cooled and diluted with 200 ml of toluene and filtration is then carried out to remove the pyridine hydrochloride. The toluene solution may be decolorized by treating with active charcoal and the polymer is precipitated in ether.

The POE-Cl obtained (20 g; 0.04 moles) is treated with 15 ml of dry acetonitrile and 0.2 moles of piperazine. The system is reacted at 85° C. for 8 hours, is cooled and 150 ml of distilled toluene are added to it. The solution is filtered and the polymer is recovered by precipitation in ether.

The thiocarbamylation is carried out as follows: 15 g of the above polymer are dissolved in 100 ml of toluene; 1 ml of triethylamine and 1 ml of $CS_2$ are added. A solution of $I_2$ in toluene is added before the endpoint. After being stirred at room temperature for 1 hour, the solution is filtered and the expected macroiniferter is precipitated in ether and dried under vacuum at room temperature. The macroiniferter is characterized by GPC: its molecular mass $\overline{Mw}$ is 14,000.

EXAMPLE 2

The procedure is as in Example 1, but starting with a POE—OH of $\overline{Mw}$ of 2,000. The molecular mass $\overline{Mn}$ of the macroiniferter obtained is 14,000.

EXAMPLE 3

Preparation of the polyiniferter of formula:

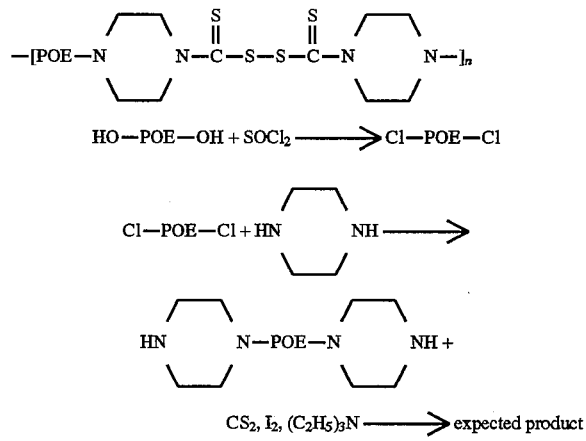

An HO—POE—OH of $\overline{Mw}$ of 3,800 was employed. The polyiniferter is produced exactly under the same conditions as in Example 1, except that the molar ratios of all the reactants to POE are doubled, given that the POE is difunctional, and that the reaction system is heated for several days to deactivate all the thiuram bonds.

A polyiniferter having the following characteristics was prepared:
molecular mass: 17,600
$\overline{n}$=4.1.

EXAMPLE 4

The procedure was as in Example 3, but starting with an HO—POE—OH of molecular mass of 8,000. The polyiniferter obtained has a molecular mass of 16,200 with $\overline{n}$=2.

EXAMPLES 5 TO 24

Tables 1 to 4 which follow illustrate the conditions of synthesis of triblock PA—PB—PA or diblock (PA—PB)$_2$ copolymers with the aid of macroiniferters of Examples 1 and 2, and of the polyiniferter of Example 3, respectively, and the results obtained.

General operating procedure for preparing triblock copolymers

The macroiniferter is dissolved in 10 ml of monomer in a Pyrex glass tube and is sealed under vacuum. The polymerization is conducted at 80°–85° C. for 24 hours. The polymer is dissolved in THF and precipitated in methanol. The unused macroiniferter is removed by dissolving. The copolymer is recovered by filtration and dried under vacuum. It is characterized by GPC (molecular mass) and by NMR (composition).

General operating procedure for preparing diblock copolymers

The operating procedure is identical with that employed for preparing the triblock polymers, except that the polymerization times can go up to 48–60 hours and that toluene must be employed as solvent. The copolymer is precipitated in heptane and is purified using cold methanol. It is characterized by GPC (molecular mass) or by NMR (composition).

TABLE 1

Synthesis conditions for the POE-PMMA-POE copolymer with the macroiniferters of Examples 1 and 2

| Ex | Macro-iniferter | [MI]* | Solvent | Conversion (%) | $\overline{Mn} \times 10^{-4}$ | I** | % POE expected in the triblock copolymer |
|---|---|---|---|---|---|---|---|
| 5 | of Ex. 2 | 10 | without | 25 | 7.05 | 2.6 | 6.1 |
| 6 | of Ex. 1 | 10 | " | 20 | 18.6 | 2.5 | 6 |
| 7 | " | 20 | " | 40 | 10.5 | 4.0 | 11 |
| 8 | " | 30 | " | 50 | 10.0 | 2.36 | 11.1 |
| 9 | " | 40 | " | 20 | 9.5 | 2 | 12 |
| 10 | " | 50 | 100% toluene | | 7.3 | 1.53 | |
| 11 | " | 70 | 100% toluene | | 6.0 | 1.42 | |

*[MI] = grams of macroiniferter per 100 ml of monomer.
**I = molecular mass polydispersity value.

TABLE 2

Synthesis conditions for the POE-PSt-POE copolymer with the macroiniferter of Example 1

| Ex | [MI] | Solvent | Conversion (%) | $\overline{Mn} \times 10^{-4}$ | I | % POE expected in the triblock copolymer |
|---|---|---|---|---|---|---|
| 12 | 10 | without | 44 | 8.5 | 1.93 | 13.5 |
| 13 | 16.7 | " | 48 | 7.2 | 1.83 | 18.7 |
| 14 | 23.3 | " | 48 | 6.5 | 1.84 | 21.6 |
| 15 | 30 | " | 63 | 5.7 | 1.97 | 29.5 |
| 16 | 50 | 100% toluene | | 4.1 | 1.48 | 28.1 |
| 17 | 70 | 100% toluene | | 3.9 | 1.45 | 29.3 |

TABLE 3

Synthesis of [POE-PMMA]$_z$ with the polyiniferter of Example 3 (temperature: 85° C.)

| Ex | [PI]* | Solvent (toluene) | $\overline{Mn} \times 10^{-4}$ | I** | % POE found by analysis | z |
|---|---|---|---|---|---|---|
| 18 | 11.5 | 150% | 4.02 | 2.4 | 25.2 | 2.7 |
| 19 | 20 | 225% | 3.54 | 2.0 | 32.5 | 3.0 |

TABLE 3-continued

Synthesis of [POE-PMMA]$_z$ with the polyiniferter of Example 3 (temperature: 85° C.)

| Ex | [PI]* | Solvent (toluene) | $\overline{Mn} \times 10^{-4}$ | I** | % POE found by analysis | z |
|---|---|---|---|---|---|---|
| 20 | 30 | 300% | 3.23 | 2.1 | 40.4 | 3.4 |
| 21 | 40 | 400% | 3.02 | 2.1 | 43.1 | 3.4 |

*[PI] = grams of polyiniferter per 100 ml of monomer.
**I = molecular mass polydispersity value.

TABLE 4

Synthesis of [POE-PSt]$_z$ with the polyiniferter of Example 3 (solvent: 100% toluene; temperature: 85° C.) The multiblock polymer obtained is purified by extraction with methanol.

| Ex | [PI] | $\overline{Mn} \times 10^{-4}$ | I |
|---|---|---|---|
| 22 | 5 | 6.35 | 2.8 |
| 23 | 10 | 6.66 | 2.1 |
| 24 | 20 | 5.96 | 2.3 |

EXAMPLES 25 to 30

Preparation of vinyl polymers terminated by an amine functional group at one end of the chain

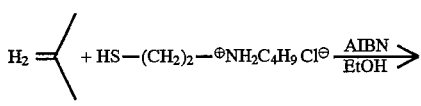

General operating method

The various vinyl monomers (MMA, EA, St) are purified under reduced pressure in the presence of $CaH_2$.

The transfer agent, namely BAET hydrochloride (Aldrich) is purified by vacuum distillation. The synthesis of the corresponding salt is performed in a solution of distilled ether by adding a molar excess of aqueous hydrochloric acid. The ether is then removed by phase separation. The salt is extracted with the aid of chloroform, the mixture being dried over sodium sulfate. After filtration followed by evaporation of the chloroform under vacuum, the salt is recovered.

To conduct the synthesis of the vinyl polymer terminated by an amine functional group at one chain end, a given quantity of transfer agent (salt) is dissolved in a given volume of ethanol. Once the salt has dissolved completely, 5 mg of AIBN ($30.4 \times 10^{-6}$ moles) are added, together with 10 ml of monomer.

The polymerization takes place at 60° C. in sealed tubes and under vacuum, the reaction mixture having been previously cooled in a mixture of solid $CO_2$ and isopropanol, degassed under vacuum, and then left at room temperature, this procedure being repeated a number of times. Diluted in a THF solution, the polymer obtained is precipitated in methanol (in the case where the monomer is St or MMA), or in a 50–50 mixture of water and methanol (in the case where the monomer is EA). It is finally dried under vacuum at 50° C. for 3–4 hours.

Table 5 below illustrates the synthesis conditions for various polymers of this type.

TABLE 5

| Ex | Monomer | Quantity of transfer agent | Volume of ethanol (ml) | $\overline{Mp}$* of the polymer obtained |
|----|---------|---------------------------|------------------------|------------------------------------------|
| 25 | EA      | 0.15                      | 5                      | 45,200                                   |
| 26 | "       | 0.25                      | 5                      | 18,700                                   |
| 27 | "       | 1.00                      | 20                     | 5,600                                    |
| 28 | MMA     | 1.00                      | 20                     | 9,800                                    |
| 29 | "       | 0.55                      | 20                     | 23,800                                   |
| 30 | "       | 0.39                      | 20                     | 38,500                                   |

*$\overline{Mp} = \sqrt{\overline{Mn}\,\overline{Mw}}$

EXAMPLES 31 to 58

Preparation of vinyl polymers terminated by an amine functional group at one chain end General operating procedure Various polymerizations are carried out in sealed, evacuated glass tubes containing the monomer, the initiator, ethanol as solvent and the chain transfer agent, in an oil bath at 60° C. After the polymerization the content of the tubes is precipitated in a large excess of methanol or heptane. The precipitate is filtered off, washed and dried. Molecular masses are determined by GPC calibrated with PMMA and PSt standards, with the aid of THF as eluent.

Preparation of DAET

DAET was liberated from its hydrochloride by treating its aqueous solution with a slight excess of NaOH. The liberated amine was extracted with ether and dried; the ether was evaporated off and the residue was distilled under vacuum.

Preparation of MEP 0.05 moles of piperazine are reacted overnight with 0.01 mole of ethylene sulfide in dry THF under reflux. THF is evaporated off and the residue distilled under vacuum. The fraction boiling at 73° C./666.6 Pa is collected.

MEP hydrochloride is prepared by treating an alcoholic solution with HCl, followed by precipitation in ether.

Preparation of BSAET 0.05 moles of trimethylchlorosilane are added dropwise under argon to 0.05 moles of BAET in 50 ml of dry ether containing 0.06 moles of triethylamine, at approximately 10° C. After addition, the system is reacted for 2 hours. The amine hydrochloride is filtered off. After having recovered the ether from the residue, the latter is distilled under vacuum. The fraction boiling at 73° C./666.6 Pa is collected and characterized by $^1$H NMR, and its purity is determined from the SH content.

Table 6 below illustrates the synthesis conditions for various polymers of this type.

TABLE 6

| | | | Polymerization conditions | | | | | |
|---|---|---|---|---|---|---|---|---|
| Ex | Monomer M | Mass | Concentration of M in ethanol in moles/l | AIBN moles/l | Transfer agent | $\dfrac{[SH]}{[M]}\,10^3$ | $\overline{Mn}$ | $\overline{Mp}$ |
| 31 | MMA | | 6.7 | $2.17 \times 10^{-3}$ | AET | 5.11 | $5.89 \times 10^5$ | |
| 32 | "   |   | "   | "   | "   | 25 | $4.27 \times 10^5$ | |
| 33 | "   | + |     | $3.5 \times 10^{-3}$ | BAET | 3.40 | $3.31 \times 10^5$ | |
| 34 | "   | " |     | "   | "   | 20.41 | $1.75 \times 10^5$ | |
| 35 | "   |   | 6 7 | $3.48 \times 10^{-3}$ | DAET | 1.32 | $4.52 \times 10^5$ | |
| 36 | "   |   | "   | "   | "   | 7.88 | $3.65 \times 10^5$ | |
| 37 | "   | + |     | $6.7 \times 10^{-3}$ | MEP | 0.43 | | $10.1 \times 10^4$ |
| 38 | "   | " |     | "   | "   | 17.44 | | $2.38 \times 10^4$ |
| 39 | EA  |   | 2.31 | $6.1 \times 10^{-4}$ | BAET-HCl | 2.13 | | $10.95 \times 10^4$ |
| 40 | "   |   | "   | "   | "   | 8.53 | | $7.32 \times 10^4$ |
| 41 | St  |   | 7.54 | $4.06 \times 10^{-3}$ | "   | 0.61 | $9.97 \times 10^3$ | |
| 42 | "   |   | "   | "   | "   | 2.97 | $3.30 \times 10^3$ | |
| 43 | MMA | + |     | $6.1 \times 10^{-3}$ | "   | 4.55 | $3.39 \times 10^5$ | |
| 44 | "   | " |     | "   | "   | 18.18 | $2.35 \times 10^5$ | |
| 45 | St  |   | 6.46 | $3.48 \times 10^{-3}$ | AET | 3.57 | | $5.96 \times 10^4$ |
| 46 | "   |   | "   | "   | "   | 12.24 | | $3.3 \times 10^3$ |
| 47 | EA  | + |     | $3.05 \times 10^{-3}$ | BAET | 0.74 | | $11.25 \times 10^5$ |
| 48 | "   | " |     | "   | "   | 2.59 | | $4.30 \times 10^5$ |
| 49 | St  | + |     | "   | "   | 0.76 | $4.75 \times 10^3$ | |
| 50 | "   | " |     | "   | "   | 3.82 | $1.10 \times 10^3$ | |
| 51 | MMA |   | 2.35 | $1.52 \times 10^{-3}$ | BAET-HCl | 6.96 | | $10.95 \times 10^4$ |
| 52 | "   |   | "   | "   | "   | 24.37 | | $2.79 \times 10^4$ |
| 53 | "   |   | 2.60 | $1.35 \times 10^{-3}$ | MEP(HCl)$_2$ | 1.12 | $1.87 \times 10^5$ | |
| 54 | "   |   | "   | "   | "   | 4.80 | $0.64 \times 10^5$ | |
| 55 | "   |   | 2.27 | $2.54 \times 10^{-3}$ | DAET-HCl | 3.80 | $5.52 \times 10^5$ | |
| 56 | "   |   | "   | "   | "   | 23.70 | $1.16 \times 10^5$ | |
| 57 | St  |   | 6.46 | $3.48 \times 10^{-3}$ | AET-HCl | 1.43 | | $2.04 \times 10^4$ |
| 58 | "   |   | "   | "   | "   | 5.65 | | $0.53 \times 10^4$ |

EXAMPLES 59 To 68

Preparation of vinyl macroiniferters

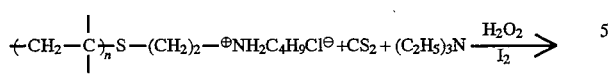

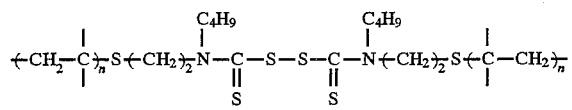

General operating procedure

The starting polymer is dissolved at a concentration of 15% by weight in chloroform. Triethylamine (Aldrich) and carbon disulfide (Aldrich) are then added in minimum molar quantities in the case of $CS_2$ and double molar quantities in the case of triethylamine.

The mixture is stirred at room temperature for approximately 30 minutes. Addition of $I_2$ results in the oxidation of sulfur and the synthesis of the macroiniferter. Secondary reaction products are separated from the starting polymer by washing with water if the starting polymer is a PEA, the PEA macroiniferter being recovered after evaporating off the chloroform under vacuum. In the case of PMMA and of PSt, the macroiniferter is recovered directly in methanol and dried under vacuum.

EXAMPLE 59

Preparation of the macroiniferter

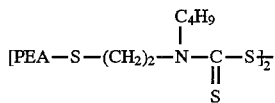

0.2 ml of triethylamine ($1.434 \times 10^{-3}$ moles) and 0.05 ml of $CS_2$ ($0.829 \times 10^{-3}$ moles) are added to 3 g of the polymer of Example 27 (0.51 moles) predissolved in 20 ml of chloroform. The mixture is stirred at room temperature for approximately 30 minutes. 0.1 g of iodine ($0.787 \times 10^{-3}$ moles) dissolved in chloroform is added, which results in the synthesis of the expected macroiniferter of $\overline{Mp}$: 12,500.

EXAMPLES 60 to 68

The following syntheses of macroiniferters were also conducted:

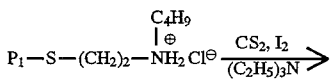

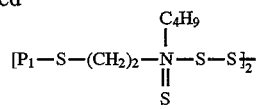

General operating procedure

The starting polymer is stirred with $CS_2$ in a proportion of 1 mole, in the presence of one mole of triethylamine per mole of starting polymer or of $CS_2$, at room temperature in chloroform. The oxidation is then conducted with the aid of a solution of iodine in $HCCl_3$.

TABLE 7

| Ex | $P_1$ | $\overline{Mp}$ of the starting polymer | $\overline{Mp}$ of the macroiniferter |
|---|---|---|---|
| 60 | PEA | 5,600 | 12,500 |
| 61 | PEA | 18,700 | 38,500 |
| 62 | PEA | 57,500 | 93,200 |
| 63 | PMMA | 23,800 | 61,500 |
| 64 | PMMA | 38,500 | 81,800 |
| 65 | PMMA | 33,000* | 60,000* |
| 66 | PSt | 15,200 | 25,000 |
| 67 | PSt | 39,400 | 57,800 |
| 68 | PSt | 77,200 | 105,100 |

*$\overline{Mw}$

EXAMPLES 69 to 88

Synthesis of triblock polymers:

PEA—PMMA—PEA and

PEA—PSt—PEA

A polymerization in solution is conducted, the macroiniferter being of the type of that in Example 59. Distilled THF is employed as solvent, in a proportion of 50 to 100% by volume relative to the MMA and St monomers, this ratio increasing with the molecular mass of the copolymerized macroiniferter. After homogenization of the solution 10 ml of MMA or of St are added. The polymerization is carried out at a temperature of 80° C., for 48 hours, in sealed tubes which are evacuated and degassed a number of times according to the operating procedure described for the synthesis of the polymer terminated by an amine functional group. The triblock polymer obtained is diluted in a THF solution and then purified by precipitation in methanol.

Table 8 below illustrates the synthesis conditions for various polymers of this type.

TABLE 8

| Ex | Monomer | PEA chain length of the macroiniferter employed (Mw) | Vol THF relative to M | % of Concentration in g of macroiniferter per 100 ml of M | Molecular mass of the triblock copolymer $\times 10^{-3}$ | I | EA mass % calculated using $\overline{Mw}$ | mass % found by analysis |
|---|---|---|---|---|---|---|---|---|
| 69 | MMA | 8 400 | 50 | 16.7 | 216 | 2.0 | 7.7 | nd* |
| 70 | " | " | " | 66.7 | 89.3 | 2.9 | 18.7 | 21.0 |
| 71 | St | " | " | 16.7 | 124.1 | 1.7 | 13.5 | 14.6 |

TABLE 8-continued

| Ex | Monomer | PEA chain length of the macroiniferter employed (Mw) | Vol THF relative to M | % of Concentration in g of macroiniferter per 100 ml of M | Molecular mass of the triblock copolymer $\times 10^{-3}$ | I | EA mass % calculated using $\overline{Mw}$ | mass % found by analysis |
|---|---|---|---|---|---|---|---|---|
| 72 | " | " | " | 100 | 37.8 | 1.5 | 44.2 | nd |
| 73 | MMA | 18 400 | 100 | 25.0 | 485.7 | 2.5 | 7.6 | 5.5 |
| 74 | " | " | " | 112.5 | 232.5 | 2.2 | 15.9 | 12.7 |
| 75 | St | " | " | 25.0 | 159.8 | 1.7 | 23.1 | 28.1 |
| 76 | " | " | " | 112.5 | 70.0 | 1.0 | 52.7 | 58.7 |
| 77 | MMA | 25 600 | " | 25 | 237.9 | 1.8 | 21.5 | 12.9 |
| 78 | " | " | " | 200 | 88.7 | 1.9 | 57.7 | 29.6 |
| 79 | St | " | " | 25 | 160.8 | 1.7 | 31.8 | 35.1 |
| 80 | " | " | " | 125 | 66.3 | 1.6 | 77.2 | 60.9 |
| 81 | MMA | 34 200 | " | 5.0 | 211.1 | 2.0 | 32.4 | |
| 82 | " | " | " | 55 | 103.5 | 1.9 | 66.2 | 20.5 |
| 83 | St | " | " | 5.0 | 251.2 | 2.5 | 27.3 | 16.6 |
| 84 | " | " | " | 55 | 118.2 | 1.7 | 57.9 | 40.8 |
| 85 | MMA | 39 100 | " | 12.5 | 326.5 | 1.4 | 24.0 | 6.0 |
| 86 | " | " | " | 62.5 | 197.5 | 1.5 | 39.6 | 17.9 |
| 87 | St | " | " | 12.5 | 377.4 | 2.7 | 20.7 | |
| 88 | " | " | " | 62.5 | 116.1 | 1.6 | 67.4 | |

*nd = not determined

EXAMPLE 89

Synthesis of a polyiniferter of formula (II) with methacrylic $P_2$

First stage

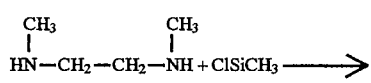

other products which are separated off by distillation

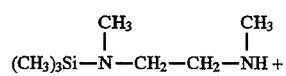

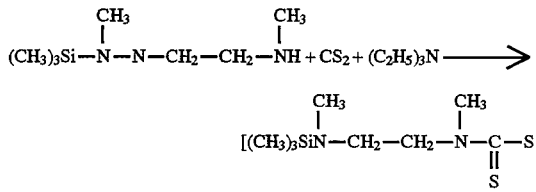

1 mole of N,N-dimethylethylenediamine is reacted with 0.2 moles of trimethylsilane chloride. After recovery, 0.1 mole of the monosilylated compound is brought into contact with 0.1 mole of $CS_2$ and 0.1 mole of $I_2$ in $HCCl_3$ containing 0.1 mole of triethylamine. The product is then washed with ice water to extract the ammonium salt and to hydrolyze the amine blocked using the trimethylsilane group according to the reaction:

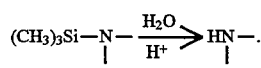

The $HCCl_3$ is then evaporated off and the product is kept protected from light.

Second stage

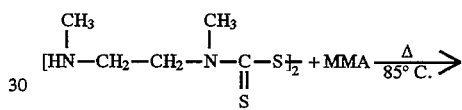

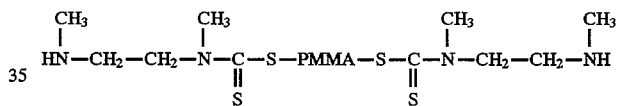

10 ml of MMA are mixed with 300 ml of the iniferter compound obtained in the first stage and the mixture obtained is sealed under vacuum in a Pyrex glass tube. The polymerization is conducted at 85° C. for 24 hours. The polymer terminated by amine functional groups at both ends is isolated by precipitation in methanol and is dried.

Third stage

Product of the second stage + $2CS_2 + I_2 + (C_2H_5)_3N \longrightarrow$

-continued

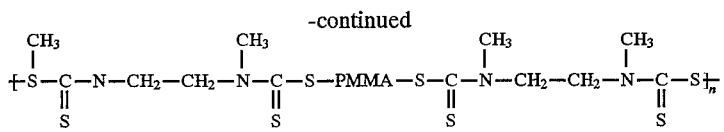

5 g of the product from the second stage are dissolved in 50 ml of CHCl₃. 0.5 ml of CS₂ and 1 ml of triethylamine are added to it, followed by a solution of I₂ in CHCl₃ until the endpoint. The polyiniferter is recovered by precipitation of the solution in methanol. The product is isolated by filtration and dried at room temperature.

EXAMPLE 90

The same synthesis as in Example 89 is conducted, but using styrene as monomer.

EXAMPLE 91

Synthesis of a diblock copolymer with PMMA and PSt blocks

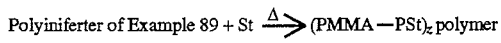

2 g of the polyiniferter obtained are mixed into 5 ml of St diluted with toluene (for example 5 ml). This mixture is sealed for 24 hours at 80° C. The polymer is isolated by precipitation in methanol. The unreacted polyiniferter is separated from the block copolymer by extraction with acetone.

EXAMPLE 92

The procedure is as in Example 91, but the polyiniferter of Example 90 is employed, and MMA as added monomer; in this case the extraction of the block copolymer is conducted with the aid of cyclohexane to remove the excess polyiniferter.

The preceding examples can be repeated with similar success by substituting the generically or specifically described reactants and/or operating conditions of this invention for those used in the preceding examples.

The polymers of this invention can be employed for the usual purposes: shaped articles, films, adhesives, laminates, etc.

The entire disclosures of all applications, patents and publications, if any, cited above, and of corresponding application French No. 89 12061 filed Sep. 14, 1989, are hereby incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

I claim:

1. A polymer containing at least one thiuram disulfide group in its main chain and denoted by the formula:

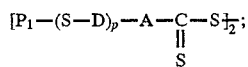

or

-continued

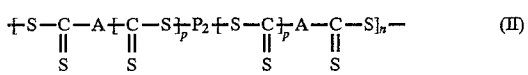

where:

each of $P_1$ and $P_2$ denotes a polymer block produced from at least one vinyl or dienic monomer, in which case p has the value of 1, or a polymer block chosen from polyoxyalkylene, polyester or polyamide blocks, in which case p has the value of 0;

A denotes:

(1) in I, if $P_1$ is not a polyamide block or a polyester block produced from a polyester terminated by an acidic or ester functional group, and in II, if $P_2$ is a polyoxyalkylene block or a polyester block produced from a polyester terminated by OH functional groups in II, an

residue, $R_1$ denoting a linear or branched alkyl group optionally comprising at least one hetero atom and/or at least one

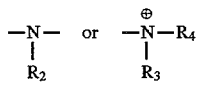

residue, (each of $R_2$, $R_3$ and $R_4$ denoting an alkyl, an alkyl, cycloalkyl or aryl group) and optionally bearing at least one functional group;

(2) an

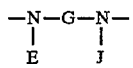

residue, where:

G denotes:

a —(CR₅R₆)ₐ— residue, with each of $R_5$ and $R_6$ denoting, independently of each other, hydrogen or an alkyl residue, which optionally comprises at least one hetero atom and/or at least one

residue, $R_7$ being an alkyl, cycloalkyl or aryl group, and denoting an integer from 1 to 6; or the residue of an aliphatic ring which optionally contains at least one hetero atom;

E and J denote, independently of each other, an alkyl group optionally comprising at least one hetero atom and/or at least one

residue, $R_8$ being an alkyl, cycloalkyl or aryl group; a cycloalkyl group; an aryl group; —K—L, K denoting a single bond; an alkylene group optionally comprising a hetero atom and/or at least one

residue, $R_9$ being an alkyl, cycloalkyl or aryl residue; a cycloalkylene group; or an arylene group; and L denotes a functional group, each of the groups E, J, $R_8$ and $R_9$ optionally having at least one functional group, E and J of the

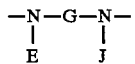

group optionally being joined to form a nitrogenous heterocyclic ring; the

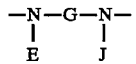

group optionally denoting:

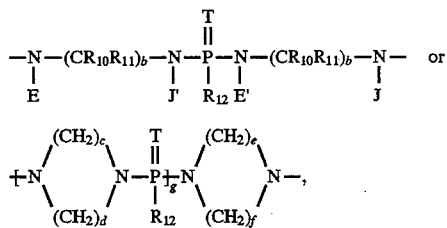

with:

b denoting an integer from 1 to 12;

each of $R_{10}$ and $R_{11}$ denoting, independently of each other, hydrogen or a $C_1$–$C_{12}$ alkyl residue, said alkyl residue optionally comprising at least one hetero atom and/or at least one

residue, $R_{13}$ being an alkyl, cycloalkyl or aryl group;

E' and J' having the same meanings as E and J, respectively;

T denoting an oxygen or sulfur atom, and =T optionally being absent;

$R_{12}$ denoting an optionally substituted $C_1$–$C_{12}$ alkyl or alkoxy, $C_3$–$C_{12}$ cycloalkyl or cycloalkoxy, aryl or aryloxy group;

each of c, d, e and f independently denoting an integer from 1 to 3;

g denoting an integer from 10 to 40;

(3) when $P_1$ denotes a vinyl or dienic block,

A can denote a

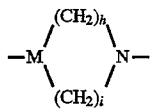

residue in formula (I)

where:

M, joined to D, —CH or —C—Q—R, Q denoting a single bond or an alkylene cycloalkylene or arylene group and R denoting COOH, COOR$_{14}$ ($R_{14}$ denoting alkyl, cycloalkyl or aryl), OH, a phosphorus-containing group, —CN or an

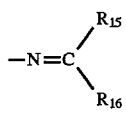

imine residue, with each of $R_{15}$ and $R_{16}$ independently denoting a $C_6$–$C_{10}$ aromatic group, a $C_5$–$C_{10}$ cycloaliphatic group or a $C_1$–$C_6$ aliphatic group; and each of h and i denoting an integer from 1 to 3;

D denotes a single bond or an alkylene, cycloalkylene or arylene group, D denoting only a single bond in the case where M denotes CH;

n has a value from 1 to 20, with the provisos that:

A is not an

residue in II, and

D is a single bond if M is CH, wherein each functional group independently is

OH;

OR$_{23}$, $R_{23}$ denoting an alkyl, cycloalkyl or aryl group;

COOH;

COOR$_{24}$, $R_{24}$ denoting an alkyl, cycloalkyl or aryl group;

Si(R$_{25}$)$_2$H, $R_{25}$ denoting an alkyl, cycloalkyl, alkoxy, aryl or aryloxy group;

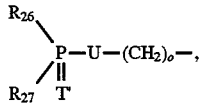

in which:

each of $R_{26}$ and $R_{27}$, which are identical or different, denotes an alkyl, alkoxy, cycloalkyl, cycloalkoxy, aryl, aryloxy or

group (each or $R_{28}$ and $R_{29}$ independently denoting alkyl, cycloalkyl, or aryl), each of the groups $R_{26}$, $R_{27}$ $R_{28}$ and $R_{29}$ optionally being substituted by at least one halogen atom;

T denotes an oxygen or sulfur atom;

U denotes a single bond, —O— or

$R_{30}$ being alkyl, cycloalkyl or aryl;

o ranges from 0 to 12;

CN; or

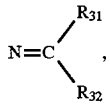

$R_{31}$ and $R_{32}$ each denoting a $C_6$–$C_{10}$ aromatic group, a $C_5$–$C_{10}$ cycloaliphatic group or a $C_1$–$C_6$ aliphatic group.

2. A polymer according to claim 1, denoted by the formula:

$$P_1\text{—}S\text{—}D\text{—}AH \qquad (IV)$$

or $$P_1\text{—}S\text{—}D\text{—}A\overset{\oplus}{H}_2\overset{\ominus}{X} \qquad (IV')$$

in which $P_1$ is a vinyl or dienic polymer block; and

X denoting halogen, the hydrogen of the terminal secondary amine group optionally being replaced by a protective group.

3. A process for the preparation of the polymers as claimed in claim 2, wherein the polymerization of the vinyl or dienic monomer $M_1$ is conducted in the presence of at least one free-radical initiator and of at least one transfer agent of formula:

$$HS\text{—}D\text{—}AH \qquad (III)$$

or $$HS\text{—}D\text{—}A\overset{\oplus}{H}_2\overset{\ominus}{X}. \qquad (III')$$

4. A diblock copolymer of formula:

$$\text{—(PA—PB)}_{\overline{z}}$$

in which PA and PB are different vinyl or dienic blocks PA being produced from the polymer of formula (II) of claim 1, z having a value from 2 to 25.

5. A polymer of formula I according to claim 1, wherein $P_1$ is methyl methacrylate or styrene, A is —N($R_1$)—, $R_1$ is $C_4H_9$ and D is $(CH_2)_2$.

6. A polymer according to claim 5, wherein $P_1$ is methyl methacrylate.

7. A polymer containing at least one thiuram disulfide group in its main chain, of the formula:

$$(P_1\text{(—S—D)A—}\underset{\underset{S}{\|}}{C}\text{—S)}_{\overline{2}}; \qquad (I)$$

or

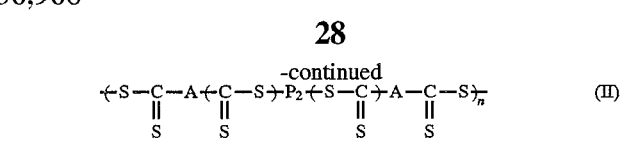

wherein:

each of $P_1$ and $P_2$ is a polymer block originating from at least one vinyl monomer or dienic monomer, A is:

(1) an

residue, optionally bearing at least one functional group, $R_1$ is a linear or branched alkyl group optionally containing (a) at least one heteroatom, (b)

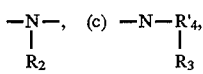

or a combination thereof, in which $R_2$, $R_3$ and $R_4$ are an alkyl, cycloalkyl or aryl group;

(2) an

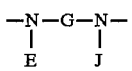

residue wherein:

G is:

(a) —$(CR_5R_6)_a$— in which a is 1–6, $R_5$ and $R_6$ are each independently (i) a hydrogen atom or (ii) an alkyl residue optionally containing (α) at least one hetero atom and/or (β) at least one

residue, in which $R_7$ is an alkyl, cyclo-alkyl or aryl group, or (b) the residue of an aliphatic ring which optionally contains at least one hetero atom;

E and J are each independently:

(a) an alkyl group optionally containing (i) at least one hetero atom and/or (ii) at least one

residue, in which $R_8$ is alkyl, cycloalkyl or aryl;

(b) a cycloalkyl group;

(c) an aryl group;

(d) a —K—L group in which L is a functional group and K is (i) a single bond; (ii) an alkylene group optionally containing (α) a hetero atom and/or (β) at least one

residue, in which $R_9$ is an alkyl, cycloalkyl or aryl group; (iii) a cycloalkylene group; or (iv) an arylene group; each of the groups E, J, $R_8$ and $R_9$ optionally having at least one functional group, (e) E and J of the $$-\underset{E}{\overset{|}{N}}-G-\underset{J}{\overset{|}{N}}-$$

group optionally being joined to form a nitrogenous heterocyclic ring; or the $$-\underset{E}{\overset{|}{N}}-G-\underset{J}{\overset{|}{N}}-$$

group in (2) is:

$$-\underset{E}{\overset{|}{N}}-(CR_{10}R_{11})_b-\underset{J'}{\overset{|}{N}}-\overset{T}{\underset{R_{12}}{\overset{\|}{P}}}-\underset{E'}{\overset{|}{N}}-(CR_{10}R_{11})_b-\underset{J}{\overset{|}{N}}- \quad \text{or}$$

$$\left[N\begin{matrix}(CH_2)_c\\ (CH_2)_d\end{matrix}N-\overset{T}{\underset{R_{12}}{\overset{\|}{P}}}\right]_g N\begin{matrix}(CH_2)_e\\ (CH_2)_f\end{matrix}N-,$$

in which:

b is an integer from 1 to 12;

$R_{10}$ and $R_{11}$ are each independently hydrogen or a $C_1$-$C_{12}$-alkyl residue optionally containing (a) at least one hetero atom and/or (b) it least one $$-\underset{R_{13}}{\overset{|}{N}}-$$

residue, in which $R_{13}$ is alkyl, cycloalkyl or aryl;

E' and J' have the same meanings as E and J, respectively;

T is an oxygen or sulfur atom, =T optionally being absent;

$R_{12}$ is substituted or unsubstituted $C_1$-$C_{12}$ alkyl or alkoxy, $C_3$-$C_{12}$ cycloalkyl or cycloalkoxy, aryl or aryloxy; c, d, e and f independently denotes an integer from 1 to 3; and g is an integer from 10 to 40; or $$-M\begin{matrix}(CH_2)_h\\ (CH_2)_i\end{matrix}N-$$

residue in formula (I)
in which:

M, joined to D, is $$-\overset{|}{\underset{|}{C}}H \quad \text{or} \quad -\overset{|}{\underset{|}{C}}-Q-R,$$

Q is a single bond or an alkylene, cycloalkylene or arylene group; and R is COOH; COOR$_{14}$, in which R$_{14}$ is alkyl, cycloalkyl or aryl; OH; a phosphorus-containing group;

$$-CN \quad \text{or an} \quad -N=C\begin{matrix}R_{15}\\ R_{16}\end{matrix}$$

imine residue, in which $R_{15}$ and $R_{16}$ are each independently a $C_6$-$C_{10}$ aromatic group, a $C_5$-$C_{10}$ cycloaliphatic group or a $C_1$-$C_6$ aliphatic group; and D is a single bond or an alkylene, cycloalkylene or arylene group; and n is 1-20, with the provisos that:

A is not an $$-\underset{R_1}{\overset{|}{N}}-$$

residue in II, and

D is a single bond if M is CH, wherein each functional group independently is

OH;

OR$_{23}$, R$_{23}$ denoting an alkyl, cycloalkyl or aryl group;

COOH;

COOR$_{24}$, R$_{24}$ denoting an alkyl, cycloalkyl or aryl group;

Si(R$_{25}$)$_2$H, R$_{25}$ denoting an alkyl, cycloalkyl, alkoxy, aryl or aryloxy group;

$$\begin{matrix}R_{26}\\ R_{27}\end{matrix}\overset{\|}{\underset{T}{P}}-U-(CH_2)_o-,$$

in which:

each of $R_{26}$ and $R_{27}$, which are identical or different, denotes an alkyl, alkoxy, cycloalkyl, cycloalkoxy, aryl, aryloxy or $$-\underset{R_{29}}{\overset{|}{N}}-R_{28}$$

group (each or $R_{28}$ and $R_{29}$ independently denoting alkyl, cycloalkyl or aryl), each of the groups $R_{26}$, $R_{27}$ $R_{28}$ and $R_{29}$ optionally being substituted by at least one halogen atom;

T denotes an oxygen or sulfur atom;

U denotes a single bond, —O— or $$-\underset{R_{30}}{\overset{|}{N}}-,$$

$R_{30}$ being alkyl, cycloalkyl or aryl;

o ranges from 0 to 12;

CN; or $$N=C\begin{matrix}R_{31}\\ R_{32}\end{matrix},$$

$R_{31}$ and $R_{32}$ each denoting a $C_6$-$C_{10}$ aromatic group, a $C_5$-$C_{10}$ cycloaliphatic group or a $C_1$-$C_6$ aliphatic group.

8. A process for the preparation of the polymer of formula (I) of claim 7, $P_1$ denoting a polymer block produced from at least one monomer $M_1$ which is a vinyl or dienic monomer, in which:

in a first stage the radical polymerization of the monomer $M_1$ is conducted in the presence of at least one free radical initiator and of at least one transfer agent of the formula:

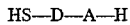  (III)

or

 (III')

X denoting halogen, the hydrogen of the terminal secondary amine group optionally being replaced by a protective group; then in a second stage, optionally after regeneration of the secondary amine, the polymer $P_1$—S—D—AH (IV) or

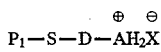 (IV')

obtained from the first stage is reacted with carbon disulfide in the presence of at least one oxidizing agent or by adding this agent after the reaction.

9. A process for the preparation of the polymer of formula (II) of claim 7, $P_2$ denoting a polymer block produced from at least one vinyl or dienic monomer $M_2$, in which:

in a first stage a compound of formula:

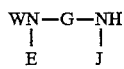 (V)

or

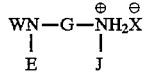 (V')

in which W is a protective group, is reacted with carbon disulfide in the presence of at least one oxidizing agent or by adding this agent after the reaction, and the produce obtained is then hydrolyzed, which produces the compound of formula:

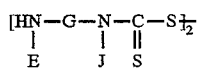 (VI)

in a second stage the polymerization of monomer $M_2$ is conducted in the presence of compound (VI); and in a third stage the polymer obtained in the second stage is reacted with carbon disulfide in the presence of at least one oxidizing agent or by adding this agent after the reaction.

10. A triblock copolymer of the formula:

in which PA is a vinyl or dienic block, and PB is a vinyl or dienic polymer block other than PA in which PA is derived from the polymer of formula (I) of claim 7.

11. A process for the manufacture of the triblock copolymer as claimed in claim 10, in which the polymerization of a monomer B is conducted in the presence of a polymer of formula (I) at a temperature of 50° to 160° C. to obtain the polymer of formula:

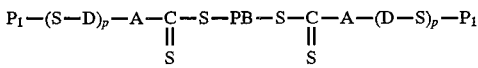

where

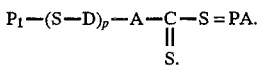

12. A process for the manufacture of the diblock copolymer as claimed in claim 10, in which the polymerization of a monomer B is conducted in the presence of a polymer of formula (II) at a temperature of 50° to 160° C., to obtain the polymer of formula:

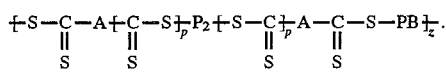

13. A polymer of claim 7 of formula (I).

14. A polymer of claim 13, wherein A denotes an

residue in which $R_1$ denotes a linear or branched alkyl group optionally comprising (1) at least one hetero atom and/or (2) at least one

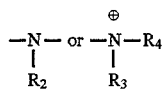

residue
in which each of $R_2$, $R_3$ and $R_4$ denotes an alkyl, cycloalkyl or aryl group, $R_2$, $R_3$ and $R_4$ optionally bearing at least one functional group.

15. A polymer of claim 13, wherein A denotes an

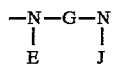

group as defined therein.

16. A polymer of claim 15, wherein E and J, independently of each other, each denote an alkyl group optionally comprising (1) at least one hereto atom and/or (2) at least one

group in which $R_8$ is (i) an alkyl group, (ii) a cycloalkyl group; (iii) an aryl group; (iv) a —K—L group in which K denotes a single bond; (v) an alkylene group optionally comprising (α) a hetero atom and/or (β) at least one

group in which $R_9$ is an alkyl, cycloalkyl,
aryl, cycloalkylene or an arylene group; and L denotes a functional group, each of E, J, $R_8$ and $R_9$ optionally bearing at least one functional group.

17. A polymer of claim 15, wherein E and J are joined and the

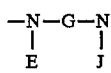

group forms a nitrogenous heterocyclic ring.

18. A polymer of claim 15, wherein E and J are joined and the

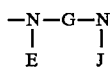

group denotes:

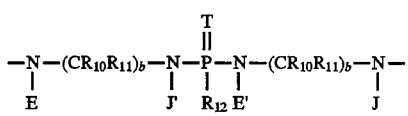

or

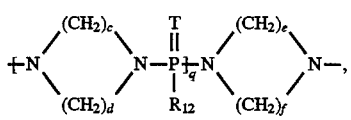

as defined therein.

19. A process for the manufacture of the polymer of formula (I), according to claim 1, $P_1$ denoting a polyoxyalkylene block or a polyester block originating from a polyester terminated by an alcohol functional group in which:

in a first stage a polymer $P_1$—OH is reacted with a halogenating agent;

in a second stage the polymer obtained $P_1$—Hal is reacted with an excess of the compound of formula:

 (X);

or

 (X')

if A has the meaning (1) or (3);

 (X")

if A has the meaning (2), or with a compound of formula (V) or (V') in which case the resulting product is hydrolyzed after its formation;

in a third stage the polymer obtained $P_1$—AH is reacted with carbon disulfide in the presence of at least one oxidizing agent or by adding this agent after the reaction.

20. A process for the manufacture of a polymer of formula (I), according to claim 1, where $P_1$ is a polyamide block or a polyester block originating from a polyester terminated by an acidic or ester functional group, in which the starting polymer employed is a polyamide terminated by a secondary amine functional group or else a polyamide or a polyester terminated by an acidic or ester functional group, which is reacted with an excess of compound (X) or (X") or with a compound (V) or (V') to obtain, after hydrolysis if need be, a polymer $P_1$—AH, which is reacted with carbon disulfide in the presence of at least one oxidizing agent or by adding this agent after the reaction.

21. A process for the manufacture of a polymer of formula (II), according to claim 1, where $P_2$ is a polyamide block or a polyester block originating from a polyester terminated by acidic or ester functional groups, in which the acidic or ester or ester functional groups, in which the acidic or ester ends of the starting polyester, and if appropriate the acidic or ester ends of the starting polyamide, are converted by reaction with an excess of compound (X) or (X") or with a compound (V) or (V'), a denoting

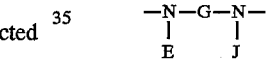

to obtain, after hydrolysis if need be, a polymer HA—$P_2$—AH, which is reacted with carbon disulfide in the presence of at least one oxidizing agent or by adding this agent after the reaction.

* * * * *